(12) United States Patent
Kakani et al.

(10) Patent No.: US 7,983,203 B2
(45) Date of Patent: Jul. 19, 2011

(54) SYSTEM AND METHOD FOR IMPROVED POWER EFFICIENCY IN A SHARED RESOURCE NETWORK

(75) Inventors: Naveen Kumar Kakani, Irving, TX (US); Yousuf Saifullah, Flower Mound, TX (US); Nico VanWaes, Keller, TX (US); Srinivas Sreemanthula, Flower Mound, TX (US); Khiem Le, Coppell, TX (US)

(73) Assignee: Nokia Corporation, Espoo (FI)

(*) Notice: Subject to any disclaimer, the term of this patent is extended or adjusted under 35 U.S.C. 154(b) by 1238 days.

(21) Appl. No.: 11/120,918

(22) Filed: May 3, 2005

(65) Prior Publication Data

US 2006/0018268 A1     Jan. 26, 2006

Related U.S. Application Data

(60) Provisional application No. 60/592,081, filed on Jul. 29, 2004, provisional application No. 60/590,183, filed on Jul. 22, 2004.

(51) Int. Cl.
*G08C 17/00* (2006.01)
*H04H 20/71* (2008.01)
*H04J 3/16* (2006.01)

(52) U.S. Cl. ............. 370/311; 370/312; 370/470

(58) Field of Classification Search ........... 370/310.2, 370/311, 312, 389, 392, 394, 395.3, 395.4
See application file for complete search history.

(56) References Cited

U.S. PATENT DOCUMENTS

| | | | |
|---|---|---|---|
| 5,625,877 A * | 4/1997 | Dunn et al. | 455/454 |
| 5,991,279 A | 11/1999 | Haugli et al. | |
| 7,412,265 B2 * | 8/2008 | Chen et al. | 455/574 |
| 2002/0105970 A1 * | 8/2002 | Shvodian | 370/468 |
| 2003/0169769 A1 | 9/2003 | Ho et al. | |
| 2005/0015703 A1 * | 1/2005 | Terry et al. | 714/776 |
| 2005/0068900 A1 * | 3/2005 | Stephens et al. | 370/252 |
| 2005/0152359 A1 * | 7/2005 | Giesberts et al. | 370/389 |
| 2008/0049654 A1 * | 2/2008 | Otal et al. | 370/311 |
| 2009/0059834 A1 * | 3/2009 | Qian | 370/312 |

FOREIGN PATENT DOCUMENTS

WO   WO 2005/067214 A1   7/2005

OTHER PUBLICATIONS

International Search Report and Written Opinion of the international Searching Authority mailed May 31, 2006 for PCT Application No. PCT/US2005/025829, 16 pages.

Lorchat, Jean, et al, "Energy Saving in IEEE 802.11 Communications Using Frame Aggregation", Globecom 2003, Dec. 105, 2003, pp. 1296-1300.

* cited by examiner

*Primary Examiner* — Pankaj Kumar
*Assistant Examiner* — Saba Tsegaye
(74) *Attorney, Agent, or Firm* — Harrington & Smith (57) ABSTRACT

A system and method for including aggregation control information in an aggregate frame that facilitates enhanced power efficiency is provided. Aggregation control information may include lengths of frames addressed to different stations and/or transmission opportunities to different stations. A receiving station is then able to calculate an offset within the aggregate frame that identifies the position of frames addressed to the receiving station and/or offset when it can use the medium to transmit it's data. The receiving station may then enter a sleep mode and awaken at a proper time for using the medium to either receive, or transmit data on the medium. Additionally, aggregation control information may include rate information to facilitate aggregation of multi-rate data in an aggregate frame.

19 Claims, 6 Drawing Sheets

SYSTEM AND METHOD FOR IMPROVED POWER EFFICIENCY IN A SHARED RESOURCE NETWORK

RELATED APPLICATION DATA

This patent application claims the benefit of provisional U.S. Patent Application Ser. No. 60/592,081, filed Jul. 29, 2004, and provisional U.S. Patent Application Ser. No. 60/590,183 filed Jul. 22, 2004.

FIELD OF THE INVENTION

The present invention relates to network technologies and, more particularly, to mechanisms for enhancing channel utilization of a shared resource network. Still more particularly, the present invention provides a system and method for improved power efficiency in a shared resource network.

BACKGROUND

Wireless local area networks (WLANs) are becoming increasingly popular for both business and residential applications. For instance, many companies are deploying WLANs in place of, or as an enhancement to, the corporate local area network. Additionally, many service industry businesses, e.g., restaurants and hotels, have deployed WLANs to provide customers with access to the Internet and/or other data networks. As WLANs have become increasingly more widespread, the number of applications designed for execution on WLAN-compliant stations has increased as well. For example, typical WLAN-compliant stations feature text messaging applications, Internet browsers, and streaming content players among other applications. A user may concurrently run any number of applications on a WLAN-compliant station.

It is particularly desirable to minimize signaling and control consumption of wireless resources in a shared resource wireless network as wireless system resources are finite and limited by the system bandwidth. Vast amounts of labor and capital have been expended to identify techniques that provide increased throughput in a shared resource system. In an IEEE 802.11 compliant network, for example, proposals have been made to improve medium access control (MAC) layer throughput by the use of single receiver station frame aggregation (SRA) or multiple receiver station frame aggregation (MRA). When MRA is employed, an aggregated frame contains one or more frames respectively directed to one or more of several stations. However, conventional MRA systems require that a station listen to an entire aggregated frame to identify the data addressed to the station. Such solutions may result in severe power drainage for power-constrained devices, such as mobile computational and communication devices. Moreover, conventional MRA systems require all data in an aggregate frame to be encoded at a common data rate. Because systems such as WLAN are expected to evolve in the future, to support multiple transmit and receive data rates, the requirement of a single data rate for frame aggregation is undesirably restrictive. Additionally, conventional WLAN-compliant stations provide a mechanism in which the medium is dedicated for use by a particular set of stations to provide power efficiency for battery limited stations. However, this solution has the deficiency of a loss of throughput that is evident by the merging of data to/from different stations.

SUMMARY

It would be advantageous to provide a system and method for an improved frame aggregation mechanism in a shared resource network. It would be further advantageous to provide an aggregation mechanism that facilitates enhanced power efficiency in a shared resource network. It would still be further advantageous to provide a mechanism of multi-rate data frame aggregation.

Embodiments of the present invention provide a system and method for including aggregation control information in an aggregate frame that facilitates enhanced power efficiency. Aggregation control information may include data unit lengths of data addressed to different stations. A receiving station is then able to calculate an offset within the aggregate frame that identifies the position of data addressed to the receiving station. The receiving station may then enter a sleep mode and awaken at a proper time for receiving only the data addressed to the receiving station and/or using the medium to transmit its data. Additionally, aggregation control information may include information of the rate of transmission to facilitate aggregation of multi-rate that includes a change in transmission power in an aggregate frame. Exemplary embodiments of the invention may be performed by a non-transitory computer-readable medium embodying a computer program executable by a device.

BRIEF DESCRIPTION OF THE DRAWINGS

Aspects of the present disclosure are best understood from the following detailed description when read with the accompanying figures.

DETAILED DESCRIPTION

This invention is related to Wireless Local Area Network (WLAN) technology and, more particularly, to inventive techniques and methods of frame aggregation. Particularly, embodiments of the disclosure provide mechanisms that increase data throughput in a shared resource system. Additionally, techniques of the present invention facilitate improved power efficiency and multi-rate frame aggregation.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1A:
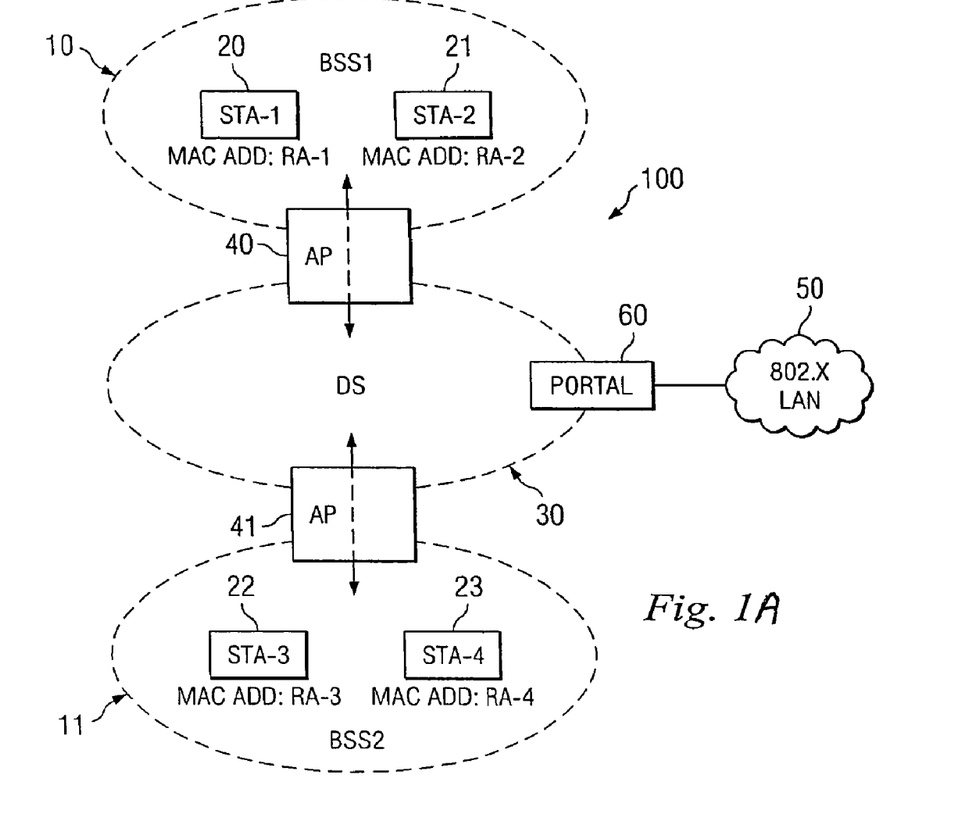
FIG. 1A is a simplified block diagram of an exemplary network environment.

FIG. 1 is a simplified block diagram of an exemplary network 100 environment. Network 100 is an example of a shared resource network. For example, network 100 may be implemented as a wireless local area network (WLAN) conforming to the IEEE 802.11 standards.

In the illustrative example, network 100 comprises two basic service sets (BSSs) 10 and 11 although any number of BSSs may be included in network 100. BSSs 10 and 11 provide respective coverage areas in which WLAN stations (STAs) 20-23 may communicate via a wireless medium with one another or with other communication or computational devices in other external networks that interface with network 100. In the illustrative example, STAs 20-23 have respective MAC addresses of RA-1-RA-4. BSSs 10 and 11 are communicatively interconnected by a distribution system (DS) 30. DS 30 enables mobile device support by providing requisite logical services for handling address to destination mapping and integration of multiple BSSs. Each of BSSs 10 and 11 include a respective access point (AP) 40 and 41 that provides access to DS 30. DS 30 provided by BSSs 10 and 11 and APs 40 and 41 facilitate creation of a wireless network of arbitrary size and complexity, and the collection of BSSs 10-11 and DS 30 is commonly referred to as an extended service set network. Logical integration between network 100 and non-IEEE 802.11 LANs, e.g., LAN 50, is provided by portal 60. Various other configurations of network 100 are possible. For example, BSSs 10 and 11 may partially overlap or may be collocated. Moreover, embodiments of the invention may be deployed in a WLAN comprising a single independent BSS.

While the descriptions of a shared resource network, devices operating therein, and wireless medium transmissions made within the shared resource network are provided herein according to IEEE 802.11 protocols, functionality, and nomenclature, such examples are illustrative only and implementations of the invention are not limited to any particular network, network-compliant device, or network communication formats or protocols. Furthermore, descriptions of the invention provided herein in relation to implementations in an IEEE 802 conformant network are illustrative only and are provided only to facilitate an understanding of the invention. Embodiments of the present invention may be implemented on other network architectures and devices that utilize shared resources for effecting data communications.

Embodiments described herein are primarily related to the physical layers (PHY) and Medium Access Control layers (MAC) that are described in IEEE Standard 802.11a-1999 and IEEE Standard 802.11-1999. While the enclosed inventive techniques and solutions are described based on the aforementioned specification, they are equally applicable to other wireless and wireline technologies as well.

Figure 2:
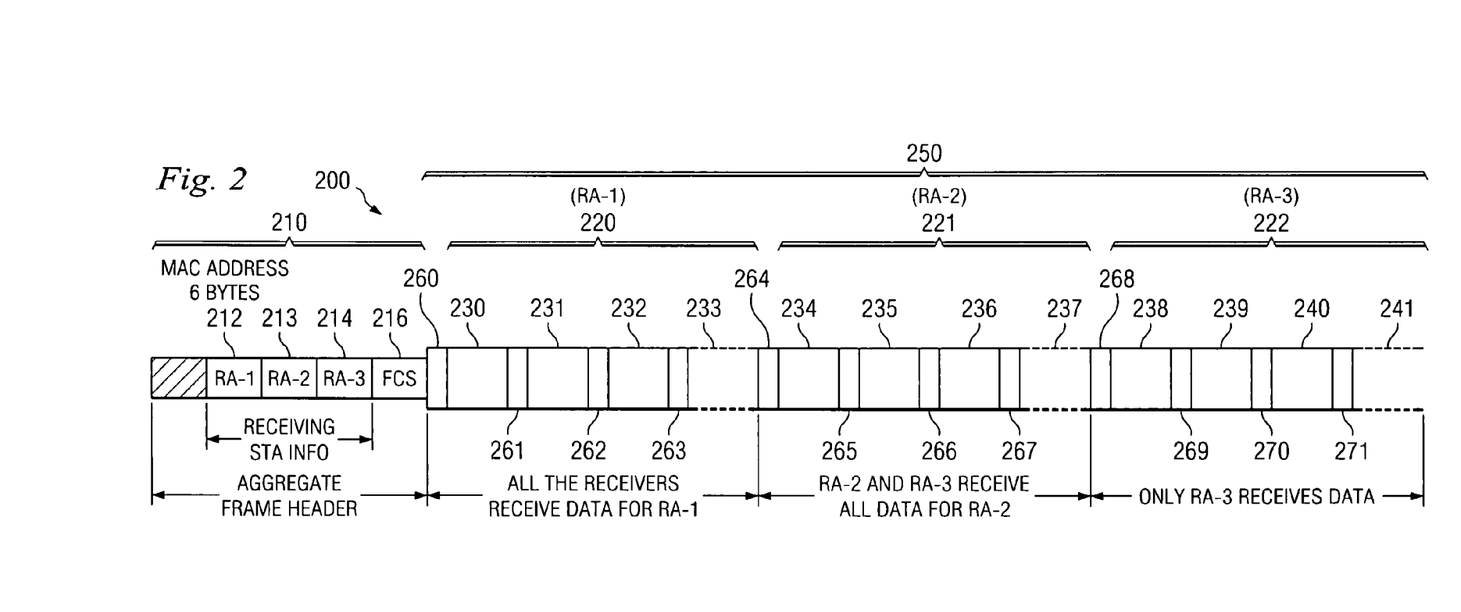
FIG. 2 is a diagram of an aggregate frame for an implementation of multi-receiver station aggregation.

With reference now to FIG. 2, there is shown a diagram of an aggregate frame 200 for an implementation of multi-receiver station frame aggregation. Aggregate frame 200 includes an aggregate frame header 210 (also referred to as aggregation, or aggregate, control information) that includes various subfields. In the illustrative example, frame header 210 includes receiver address (RA) fields 212-214 that respectively contain an address, e.g., a six byte MAC address, of a receiver station, a portion of MAC address, or a specific ID assigned by the network to the STA, that has data directed thereto carried within aggregate frame 200. In the present example, aggregate frame 200 is representative of an aggregate frame that carries payload data to STAs 20-22 shown in FIG. 1, and thus frame header 210 includes station addresses (RA-1, RA-2, and RA-3) in respective RA fields 212-214. Frame header 210 may have an error checking code such as a frame check sequence (FCS) 216 appended thereto or it may be a MAC frame Payload data, e.g., a MAC frame, is carried in a data field 250. Data field 250 includes various frame subfields each respectively associated with one of the receiver stations identified by a receiver address in frame header 210. In the present example, data field 250 includes frame subfields 220-222 each respectively having payload data directed to one of receivers 20-22 shown in FIG. 1 respectively addressed in receiver address field 212-214. Each of frame subfields 220-222 carries payload data comprising one or more MAC frames. In the present example, frame subfield 220 carries MAC frames 230-233 addressed to station 20 shown in FIG. 1 having MAC address RA-1, frame subfield 221 carries MAC frames 234-237 addressed to station 21 shown in FIG. 1 having MAC address RA-2, and frame subfield 222 carries MAC frames 238-241 addressed to station 22 shown in FIG. 1 having MAC address RA-3. MAC frames 230-241 may be representative of MAC protocol data units (MPDUs) and are accordingly separated by MPDU delimiters 261-271. Likewise, MAC frame 230 is separated from frame header 210 by a delimiter 260.

The multi-receiver frame format shown in FIG. 2 allows MAC frames directed to multiple stations to be packaged and sent to the multiple stations in a common frame. However, a station having payload data included in aggregate frame 200 is required to maintain power to the station radio circuitry until the data addressed thereto has been received. Consequently, a station may be, and often is, required to receive data (up to all data included in aggregate frame 200) directed to other stations in order to receive data addressed to the station. For example, on processing of frame header 210, each of stations 20-22 shown in FIG. 1 having one of addresses RA-1, RA-2, and RA-3 will maintain radio power and process incoming frames until all frames addressed thereto are received. At this time, a receiving station may power down its radio unit to conserve power. For example, each of stations 20-22 shown in FIG. 1 will receive and process frame header 210 and recognize that it is a recipient of frames in aggregate frame 200. Thus, each of stations 20-22 shown in FIG. 1 will receive MAC frames 230-233 although frame subfield 220 only contains frames addressed to station 20 shown in FIG. 1.

After receipt of MAC frames 230-233, station 20 shown in FIG. 1 may temporarily power down its radio to conserve power. However, respective radio units of STAs 21-22 shown in FIG. 1 must be powered until data in respective frame subfields 221-222 is received thereby. Both STAs 21-22 shown in FIG. 1 discard frames of frame field 220 on receipt thereof. Each of STAs 21-22 shown in FIG. 1 maintains radio power and subsequently receives frames 234-237 of frame subfield 221 addressed to STA 21 shown in FIG. 1. Upon reception of MAC frames 234-237, STA 21 shown in FIG. 1 may temporarily power down its radio. STA 22 shown in FIG. 1 discards MAC frames 234-237 and maintains radio power until MAC frames 238-241 addressed thereto are received.

Although aggregate frame 200 facilitates delivery of data units addressed to different receiver stations by way of a common data frame, this frame aggregation mechanism is less than ideal. For example, this aggregated frame scheme results in inefficient power consumption characteristics of network stations because a STA receiving an aggregated frame is required to read the MAC headers of all the MPDUs in order to recognize MPDUs addressed thereto. Moreover, frame aggregation is only performed on data of a single data rate. For example, MAC frames 230-241 of aggregate frame 200 must each be encoded at a common data rate. In a WLAN environment, for example, different stations may experience different data rates at any given instance. Thus, providing frame aggregation at a single data rate limits the applicability of frame aggregation.

Embodiments of this disclosure provide improvements for the above-described deficiencies. In one aspect, embodiments described herein provide aggregation of MAC frames with less preamble and header overhead thereby increasing data throughput relative to conventional aggregation methodologies. Moreover, embodiments described herein provide frame aggregation across different data rates. Multiple data rate frame aggregation is provided by including data units of different rates and associated offsets in an aggregated frame as described more fully hereinbelow.

Figure 3A:
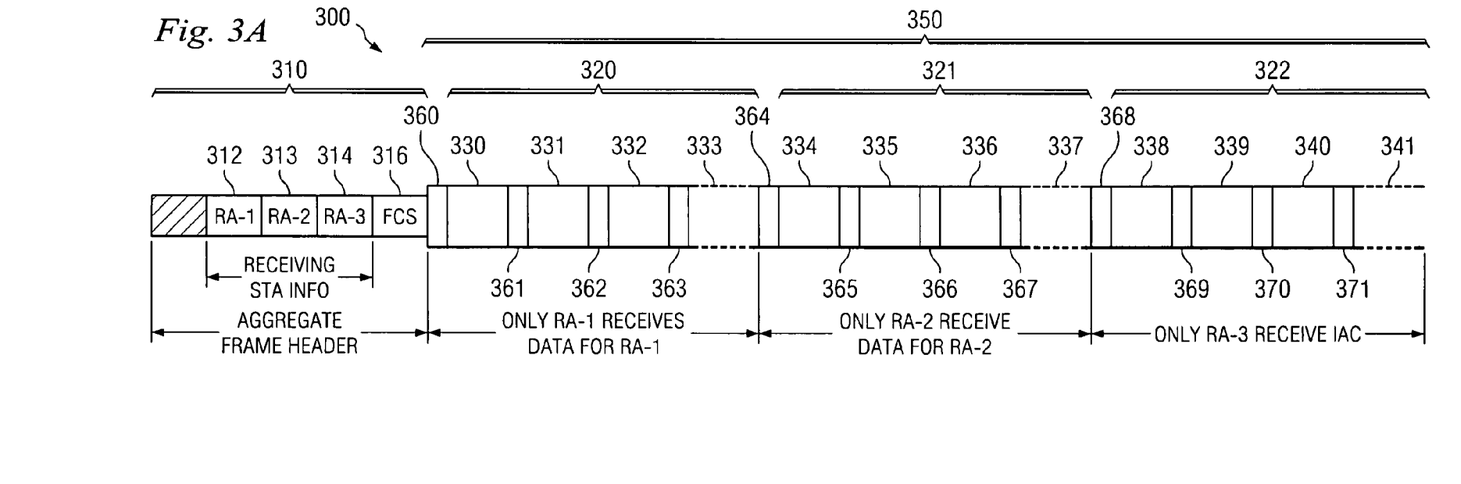
FIG. 3A is a diagram of an embodiment of an aggregate frame that facilitates increased power efficiency in a shared resource network.

With reference now to FIG. 3A, there is shown a simplified diagram of an embodiment of an aggregate frame 300 that facilitates increased power efficiency in a shared resource network. Aggregate frame 300 may include an aggregate frame header 310 that has various subfields. In the illustrative example, frame header 310 may include RA fields 312-314 that respectively contain an address, e.g., a six-byte MAC address, a part of the MAC address, or a unique ID allocated to the STA by the network, of a receiver station that has data addressed thereto carried within aggregate frame 300. In the present example, frame header 310 includes three station addresses (RA-1, RA-2, and RA-3), and a payload field 350 thus includes three frame subfields 320-322 that respectively include MAC frames directed to one of the receiver stations having addresses identified in receiver address fields 312-314. Particularly, frame subfield 320 includes MAC frames 330-333 addressed to STA 20 shown in FIG. 1 having an address RA-1, frame subfield 321 includes MAC frames 334-337 addressed to STA 21 shown in FIG. 1 having an address RA-2, and frame subfield 322 includes MAC frames 338-341 addressed to STA 22 shown in FIG. 1 having an address RA-3. Frame header 310 may have an error checking code such as a frame check sequence (FCS) 316 appended thereto (or this may be a frame sent at the PHY or MAC layer. In the illustrative example, MAC frames 330-341 are representative of MPDUs and are separated by MPDU delimiters 361-371. Likewise, MAC frame 330 is separated from frame header 310 by a delimiter 360.

To facilitate multi-receiver frame aggregation with power efficiency enhancement, one or more fields of aggregate frame 300 may include information regarding an offset between the frame header and payload data. For example, by providing information regarding the offset between header 310 and the beginning of frame subfield 321 that carries data addressed to STA 21 shown in FIG. 1, the radio unit and associated circuitry of STA 21 shown in FIG. 1 may be powered down for the duration of the payload offset. In this manner, STA 21 shown in FIG. 1 is able to save power by avoiding energy consumption for the unnecessary reception of MAC frames 330-333 not addressed to STA 21 shown in FIG. 1.

In another embodiment, the aggregated frame can be used to allocate radio resources to STAs. For example, rather than address field 312 (shown in FIG. 3) designating that MAC frames 330-333 are addressed to STA 20 (shown in FIG. 1) for reception by STA 20, it can designate the resource allocation for STA 20 to originate/transmit MAC frames 330-333. The offset period allocated to each STA can be interpreted as the time when STA 20 can use the medium to send its date. Note that the mechanism to allocate resources to STAs can be done along with (or independently) in the same radio burst as shown in FIG. 3.

In the present embodiment, payload offset information may be included in receiver address fields 312-314. For example, receiver address field 312 may include a MAC address subfield 312a, a MPDU count subfield 312b, and a payload length subfield 312c as shown in the diagram of an embodiment of receiver address field 312 shown in FIG. 3B. MAC address subfield 312a includes the MAC address RA-1 of STA 20 shown in FIG. 1 to which MAC frames 330-333 are directed. MPDU count subfield 312b includes a numerical identifier of the number of MPDUs in frame subfield 320. Payload length subfield 312c contains a numerical identifier that specifies the length, e.g., in bytes, time duration, physical layer symbols, or the like, of frame subfield 320. In a similar manner, receiver address field 313 may be configured similar to receiver address field 312 and include a MAC address subfield that specifies the MAC address of the station to which MAC frames in frame subfield 321 are directed, a MPDU count field that specifies a numerical identifier of the number of MPDUs in frame subfield 321, and a payload length field that specifies the length of frame subfield 321. Likewise, receiver address field 314 may include a MAC address subfield that includes the MAC address of the station to which MAC frames in frame subfield 322 are directed, a MPDU count field that includes a numerical identifier of the number of MPDUs in frame subfield 322, and a length field that specifies the length of data subfield 322.

All receiving stations process aggregate frame header 310 on receipt of aggregate frame 300. A respective payload offset length may then be computed or otherwise obtained by each receiving station to determine the offset from header 310 to the receiving station's payload data. For example, assume STA 21 shown in FIG. 1 receives aggregate frame 300. STA 21 shown in FIG. 1 processes frame header 310 and identifies itself as a data recipient on recognition of MAC address RA-2 assigned thereto in address field 313. STA 21 shown in FIG. 1 then calculates the offset length from header 310 to frame subfield 321 by processing the length information of frame subfield 320 stored in address field 312. For example, STA 21 shown in FIG. 1 may identify the offset length between the end of header 310 and the beginning of frame subfield 321 as the length of frame subfield 320, i.e., the length specified in length subfield 312c. In a similar manner, STA 22 shown in FIG. 1 having MAC address RA-3 may calculate a payload offset length by summing the length of frame subfield 320 identified in the length subfield of address field 312 and the length of frame subfield 321 identified in the length subfield of address field 313. Accordingly, a receiver station, responsive to calculating or otherwise identifying a payload offset, may power down its radio unit and associated circuitry for a duration (or portion thereof) of the calculated payload offset. Logic for switching of a radio unit or other circuitry may be included in the PHY layer of a WLAN compliant STA.

Embodiments for providing offset control information in an aggregate frame as described in FIGS. 3A and 3B may be implemented in a frame PHY or MAC layer as described more fully hereinbelow. The above-described frame format and length offset calculation technique provides a mechanism to increase power efficiency. The multi-receiver aggregate frame format includes a respective length identifier for MPDU frames addressed to each station that has payload data in aggregate frame 300. All receiving stations process the multi-receiver aggregate frame header and compute the payload length offset in bytes or another duration measure to facilitate reception and recovery of the appropriate data. This length of the payload offset may be translated into other parameters in the receiver station PHY layer for switching off the radio for the offset duration or a portion thereof.

Other embodiments of the described aggregate frame include methods for utilizing the number of orthogonal frequency-division multiplexed (OFDM) symbols as a payload length measure rather than the payload length in bytes. It is also possible to include the length or OFDM number for the entire data for each station.

Techniques of frame aggregation across multiple data rates are provided by other embodiments. Information that identifies different data rates and corresponding payload offsets may be included in an aggregated frame to facilitate aggregation and efficient reception of multi-rate data. In one embodiment, an aggregated frame with payload data of different data rates may be configured to exploit the fact that a transmitter requires approximately one OFDM symbol duration to flush out a channel encoder before transmitting data at a different data rate. In this implementation, one or more OFDM long mid-ambles may be inserted between data of two different data rates. Also, the mid-ambles can be used at the start of data of a STA, so that the STA can take care of any Phase or Time offset due to switching from power save mode to active mode. The mid-amble utilizes the delay needed for rate switching and also provides channel estimation to the receiving STAs. Thus, channel coherence across different data rates is thereby provided.

In another embodiment, a mechanism is provided for a receiving STA identifier (ID) or address and an MPDU (or payload) offset to collectively identify the beginning position of payload data in an aggregated frame. The STA ID identifies a receiving STA. For example, a station ID may comprise a station MAC address or it may be another address or identifier that uniquely identifies the receiving STA within a network. Information for identifying the beginning of an MPDU may be provided at either the PHY layer or the beginning of the MAC layer. This allows a STA to recognize the position of MPDUs addressed thereto within an aggregate frame by reading only the aggregation control information. The STA may subsequently enter a sleep mode, e.g., by fully or partially power down sub-systems within the STA such as radio frequency (rf) transceiver, baseband, display driver, or other sub-system, and subsequently wake up or otherwise reactivate at the position the MPDUs addressed thereto may be received. In this manner, an increase in power efficiency of a STA is provided. Embodiments described herein that provide increased power efficiency for multi-rate frame aggregation may be implemented by information included in either a PHY lay header or MAC layer header as described below.

Figures 3B, 4A:
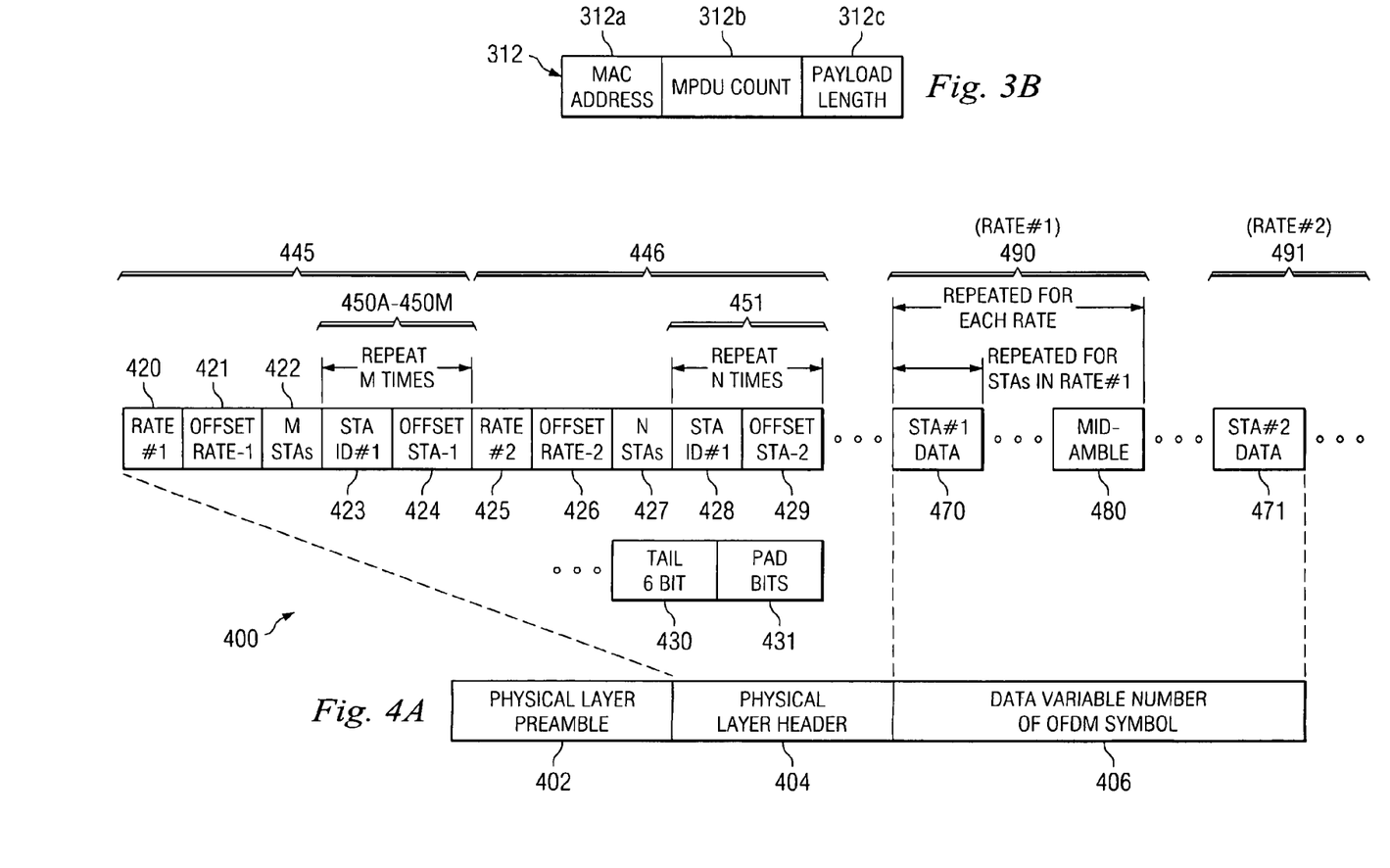
FIG. 3B is a diagram of an embodiment of subfields of a receiver address field of the aggregate frame described in FIG. 3A.
FIG. 4A is a diagram of an embodiment of an aggregation frame having multi-rate aggregation control information included in PHY layer preamble and headers.

FIG. 4A is a simplified diagram of an embodiment of an aggregation frame 400 having multi-rate aggregation control information included in PHY layer preamble and headers. In this embodiment, a station may be adapted to recognize whether any MAC frame in aggregate frame 400 is addressed to the station by reading only the physical layer header. An explicit indication of the position of payload data addressed to the station allows the station to enter a sleep mode rather than reading all MAC headers to determine which frames are addressed to the station.

In the illustrative example of FIG. 4A, aggregate frame 400 includes a physical layer preamble 402, a physical layer header 404, and a payload or frame field 406. Physical layer header 404 includes various multi-rate aggregation control fields. The aggregation control information added at the PHY layer may comprise one or more of the following fields: a rate (RATE) field 420, 425, a rate offset field 421, 426, a station count field 422, 427, a station ID field 423, 428, a station offset field 424, 429, a tail field 430, and a pad bit field 431.

Aggregation control information may be organized or otherwise configured in sets of associated control information. As referred to herein, a rate control field set comprises aggregation control information of a single data rate for one or more stations. Fields in a rate control field set are mutually associated. Any number of rate control field sets may be included in aggregate frame 400 dependent on the number of data rates represented by aggregate frame 400 and system constraints on the available length of aggregate frame 400. In the illustrative example, two rate control field sets 445 and 446 are shown. Rate control field set 445 includes control information of a data rate (RATE#1), and rate control field set 446 includes control information of another data rate (RATE#2).

The rate field indicates a particular data rate value at which one or more STAs have MAC frames encoded in aggregate frame 400. In the present example, two rate fields 420 and 425 are included in aggregate frame 400, and thus aggregate frame 400 includes payload data of two data rates (RATE#1 and RATE#2). Rate offset field 421 and 426 respectively include an identification of an offset length for a mid-amble or payload data. A mid-amble is preferably transmitted between data of different rates in aggregate frame 400 and thereby provides a delimiter between aggregate data of different data rates. A rate offset value specifies a length from a reference point, such as the beginning of frame field 406, the beginning of physical header 404, or the like, to the beginning of data encoded at the data rate associated with the rate offset value (or, alternatively, to a mid-amble preceding data encoded at the data rate associated with the rate offset value). In the examples provided herein, assume rate offset values provide offsets measured from the beginning of frame field 406. For a first rate offset field 421, the rate offset value specified thereby indicates an offset length to the beginning of payload data encoded at the first data rate stored in frame field 406. For subsequent rate offset fields associated with other data rates, such as rate offset field 426 associated with data rate RATE#2, the rate offset value specified thereby indicates an offset length to a mid-amble that precedes a first data payload encoded at the associated data rate. For example, rate offset field 426 specifies an offset from the beginning of frame field 406 to the beginning of data encoded at data rate RATE#2. The offset length identified in a rate offset field may, for example, define an offset length in terms of OFDM symbols, time duration in micro-seconds, length in bytes, or the like. An offset length in bytes may indicate the length of MPDUs for an associated station.

A station count field indicates a number of stations that have aggregated data for a data rate associated with the station count field. Aggregate frame 400 includes two station count fields 422 and 427 that each respectively identify the number of stations having data in aggregate frame 400 that is encoded at the data rate associated with station count fields 422 and 427. For example, station count field 422 has a value that specifies a number, M, of stations that have data encoded at the data rate (RATE#1) identified in associated rate field 420. Likewise, station count field 427 has a value that specifies a number, N, of stations that have data encoded at the data rate (RATE#2) identified in associated rate field 425.

Control information uniquely associated with a single station may be organized or otherwise configured in sets of associated control information. As referred to herein, a station control field set comprises control information of a single station. In the present example, a station control field set 450A-450M, 451 includes one or more station ID field 423, 428 and a station offset field 424, 429 although other control information related to a single station may be included in a station control field set. A station ID field indicates a destination STA address or other identifier. A station offset field may indicate an offset in terms of OFDM symbols, time in micro-seconds, length in bytes, or the like for a STA identified in an associated STA ID field. Particularly, a station offset field specifies an offset length of station payload data encoded at a particular rate measured from the beginning of aggregate data encoded at that data rate. Thus, a rate offset value and a station offset value collectively identify the position within aggregate data at which data addressed to a particular station is located. A STA determines its payload offset in the aggregated data based on the station offset field in conjunction with an associated rate offset field. In this manner, a station may enter an idle period and thereafter wake up or reactivate to receive only the MAC frame data addressed thereto. A length in bytes identified in a station offset field may indicate the length of individual MPDU frame lengths for each station. The station offset may comprise a single value (or, alternatively, a set of values) for each MPDU frame addressed to a STA.

Figure 4B:
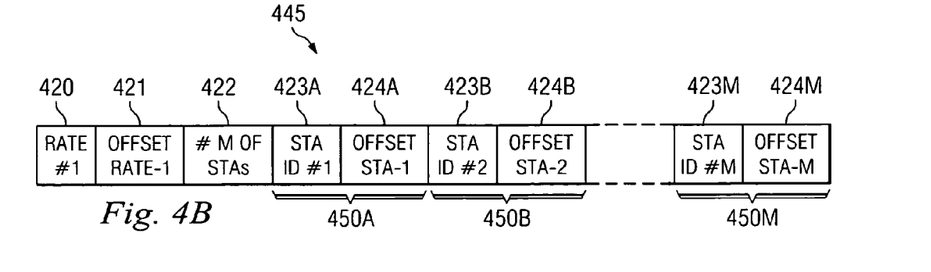
FIG. 4B is a diagram of an embodiment of rate control field set that shows multiple instances of a station control field set of the aggregation frame shown in FIG. 4A.

The illustrative example shows a single instance of station control field set 450A-450M and 451 respectively located within rate control field set 445 and 446 to simplify the illustration. However, multiple instances of station control field set 450A-450M and 451 may respectively be included in rate control field set 445 and 446. For example, FIG. 4B is a diagram of an embodiment of rate control field set 445 that shows M instances of station control field set 450A-450M. Each of station control field sets 450A-450M includes a respective station ID field 423A-423M and a corresponding station offset field 424A-424M. Each station control field set 450A-450M is uniquely associated with a single station by way of the station ID respectively included in station ID field 423A-423M. In a similar manner, rate control field set 446 may include N instances of station control field set 451 with each instance of the station control field set including a respective station ID field and a corresponding station offset field.

Other rate control field sets may follow rate control field set 446. After a final rate control field set of physical layer header 404, a tail field 430 and a pad bit field 431 may be appended to physical layer header 404. Tail field 430 indicates the end of physical layer header 404. Unused bits of a symbol may be used in pad bit field 431 or reserved bits to consume the remainder of physical layer header 404.

Frame field 406 follows physical layer header 404 and may include aggregate multi-rate payload data in one or more data subfields. Frame subfields may be configured in one or more data sequences each having payload data of a common data rate. For example, a RATE#1 data sequence 490 includes payload data encoded at the data rate RATE#1, and RATE#2 data sequence 491 includes payload data encoded at the data rate RATE#2. In the present example, data sequences 490 and 491 each respectively include one or more instances of frame subfields 470 and 471. Each instance of frame subfield 470 includes payload data encoded at the data rate RATE#1, and each instance of frame subfield 470 is addressed to one of the M stations specified in station ID field 423A-423M. In a similar manner, each instance of frame subfield 471 includes payload data encoded at the data rate RATE#2, and each instance of frame subfield 471 is addressed to one of the N stations specified in an instance of station ID field 428. Data of different data rates are preferably separated by a mid-amble 480 or other delimiter.

Figure 4C:
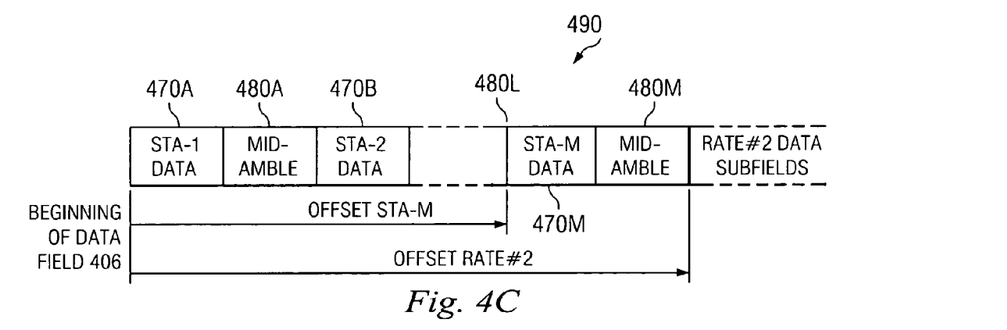
FIG. 4C is a diagram of an embodiment of frame subfields of a particular data rate included in a frame field of the aggregation frame shown in FIG. 4A.

In the illustrative example, a single instance of frame subfield 470 is shown in RATE#L data sequence 490, and a single instance of frame subfield 471 is shown in RATE#2 data sequence 491 to simplify the illustration. However, one or more instances of frame subfield 470 and 471 may respectively be included in data sequence 490 and 491. The particular number of frame subfields included in a data sequence is dependent on the number of stations having payload data at the corresponding data rate. For example, FIG. 4C is a diagram of an embodiment of frame subfields having payload data encoded at the data rate RATE#1. Frame subfields are sequentially ordered in RATE#1 data sequence 490; Mid-ambles 480A-480L may be inserted between payload data addressed to different stations. For example, mid-amble 480A is inserted between frame subfields 470A and 470B. Mid-amble 480 is inserted after a final frame subfield 470M and separates frames of different data rates.

Each of frame subfields 470A-470M contain payload data addressed to a station identified in rate control field set 445 associated with the data rate RATE#1 of data sequence 490. Particularly, frame subfields 470A-470M contain payload data addressed to a respective station identified in station ID field 423A-423M of station control field set 450A-450M shown in FIG. 4B. In a similar manner, N instances of frame subfield 471 having data encoded at the data rate RATE#2 are included in frame field 406, and each instance of frame subfield 471 contains payload data addressed to one of the N stations specified in respective instances of station ID field 428.

By including station IDs in the PHY layer of aggregate frame 400, a station may be adapted to recognize whether any frames(s) in aggregate frame 400 is addressed to the station by reading only physical layer header 404. The explicit indication of frame or payload position allows improved power efficiency for STAs having data aggregated in aggregate frame 400. In this manner, a station is not required to read all MAC headers to determine which frames are addressed to the station.

As an example, assume a station having a station identifier of STA-M receives aggregate frame 400. The station may recognize upon reading physical layer header 404 that aggregate frame 400 includes data addressed thereto. In this instance, the station is identified in the last station control field set 450M of rate control field set 445, and thus payload data addressed thereto is included in the last frame subfield 470M of RATE#1 data sequence 490. In this instance, the station reads the rate offset value identified in rate offset field 421 and the station offset value in station offset field 424M to determine the payload offset to frame subfield 470M. As noted above, rate offset field 421 provides an offset to a position at which data encoded at the data rate RATE#L is first included in frame field 406. That is, rate offset field 421 provides an offset to first frame subfield 470A having data encoded at the data rate RATE# 1. The station offset read from station offset field 424M identifies the position of frame subfield 470M. Particularly, the station offset specified in station offset field 424M provides an offset length from the first frame encoded at data rate RATE#1 to the beginning of frame subfield 470M (or, alternatively, to mid-amble 480L) as shown in FIG. 4C. In this scenario, the station may enter a sleep mode for the duration of frame subfield 470A to the beginning of frame subfield 470M as shown in FIG. 4C.

As another example, consider a station having data addressed thereto that is encoded at the rate (RATE#2) identified in rate field 425. In this instance, the station reads physical layer header 404 and recognizes that data included in aggregate frame 400 is addressed thereto. The station determines the offset to its payload data by reading the rate offset value in rate offset field 426 and a station offset value in the instance of station control data set 451 that includes the station's ID in the station ID field thereof. The rate offset value specified in rate offset field 426 may specify the offset to the mid-amble preceding the first frame subfield of RATE#2 data sequence 491 having payload data encoded at the data rate RATE#2. That is, rate offset field 426 specifies an offset value to mid-amble 480M that precedes the first frame subfield having data encoded at data rate RATE#2 as shown in FIG. 4C. The station offset value read from the station offset field associated with the station provides a station offset from mid-amble 480M to the payload data addressed to the station. In this instance, the payload offset is the sum of the rate offset value and the station offset value. Thus, the station may enter a sleep mode for a sum of the duration of all frames encoded at data rate RATE#1 and any frame subfields having data encoded at data rate RATE#2 that precede the frame subfield addressed to the station.

It is to be noted that the aggregation control information may be included at the PHY layer in various other configurations without departing from the spirit of the invention. For instance, it may be added as a part of a new header, as described in the above embodiment and depicted in FIG. 4, or as part of the existing header. Advantageously, aggregation control provided at the PHY layer allows for improved power efficiency and savings as well as multi-rate aggregation.

Figure 5:
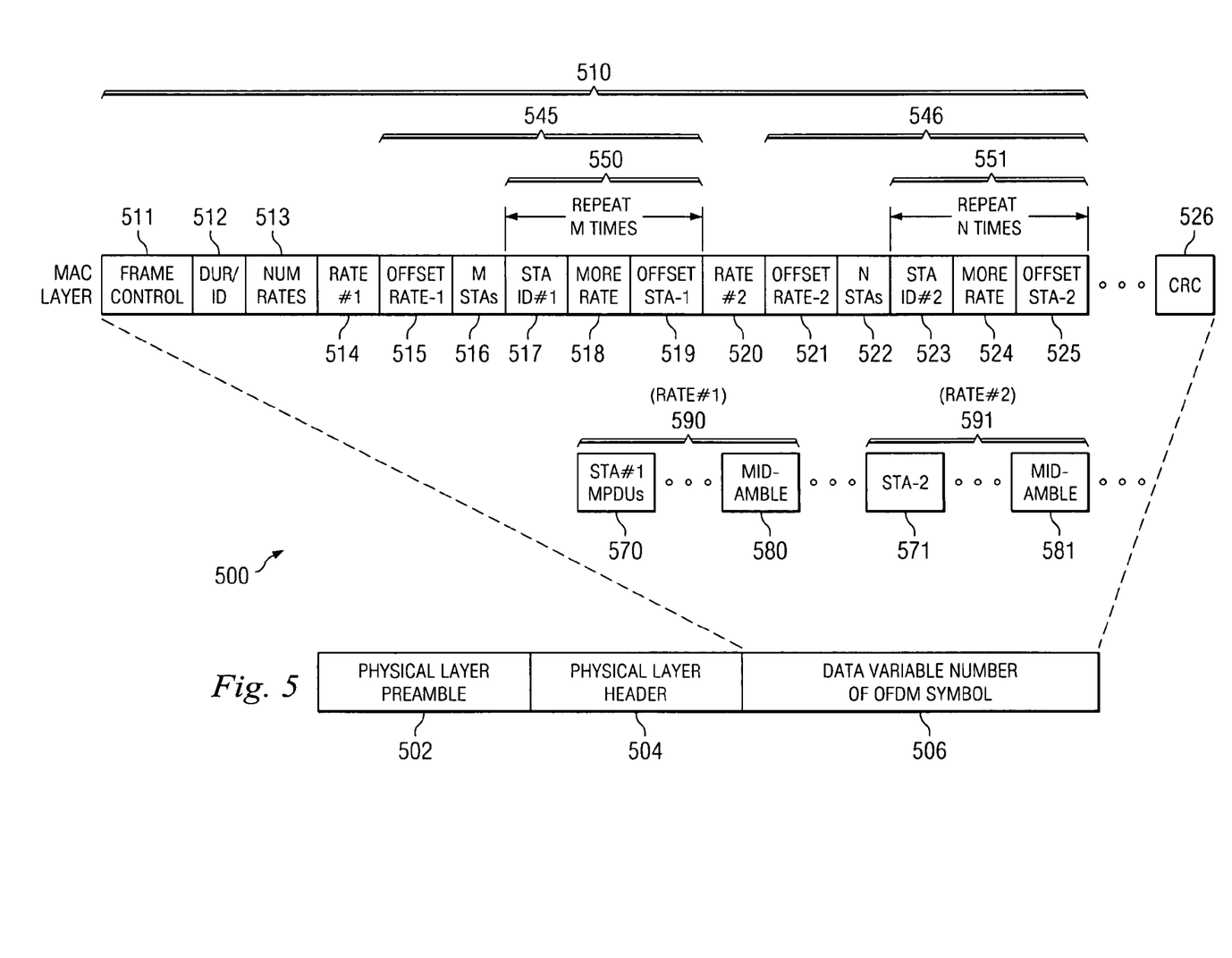
FIG. 5 is a diagram of an embodiment of an aggregate frame having multi-rate aggregation control information included in the MAC layer.

FIG. 5 is a diagram of an embodiment of an aggregate frame 500 having multi-rate aggregation control information included in the MAC layer. Aggregate frame 500 may include a physical layer preamble 502, a physical layer header 504, and a frame field 506 in the MAC layer of aggregate frame 500. Aggregation control information included in data frame 506 provides enhanced power efficiency and multi-rate aggregation. Aggregation control information may be included in the MAC layer by way of a MAC frame 510 included in frame field 506. MAC frame 510 may include a frame control field 511 and a duration/ID field 512. Frame control field 511 may include, for example, various subfields that define a protocol version, a frame type and frame subtype that define the function of the frame, whether the frame is destined for a DS or exiting a DS, and other control information. Duration/ID field 512 may define the duration of aggregate frame 500. For example, the duration of aggregate frame 500 specified in duration/ID field 512 may be represented by the number of symbols, bits, bytes, the duration in microseconds, or the like. For a detailed description of exemplary frame control field 511 and duration/ID field 512, see IEEE Standard 802.11a-1999 and IEEE Std 802.11-1999.

Aggregation control information included in MAC frame 510 comprises one or more instances of a rate count field 513 and a "more rate" field 518, 524. A rate count field indicates a number of different data rates present in aggregate frame 500. The rate count field allows a STA decoder to determine an end of the aggregation control information. A "more rate" field may be implemented as a single bit field that indicates whether a station has to wake up at a subsequent mid-amble to obtain data at an additional rate. That is, a "more rate" field is used to indicate to a station that the station has data of multiple rates addressed thereto in aggregate frame 500. For example, it is possible that a station has data at multiple rates addressed thereto in a multicast scenario. In this instance, data addressed to the station as part of multicast traffic may be transmitted at one rate, while data uniquely transmitted to the station as unicast traffic may be transmitted at another data rate.

Additionally, aggregation control information included in MAC frame 510 may comprise one or more instances of the following fields: a rate field 514, 520, a rate offset field 515, 521, a station count field 516, 522, a station ID field 517, 523, and a station offset field 519, 525 all of which may be configured and contain similar control information as described above with reference to FIG. 4.

In the illustrative example, aggregation control information includes a rate count field 513 that identifies the number of data rates present in aggregate frame 500. A first rate field 514 may include an identification of a first data rate of frames that are included in aggregate frame 500. A subsequent rate offset field 515 includes an offset length that specifies an offset to the beginning of frames encoded at the data rate identified in rate field 514. A subsequent station count field 516 includes a numerical identifier of the number, M, of stations having frames at the data rate identified in rate field 514. One or more station control field sets 550 including station ID field 517, "more rate" field 518, and station offset field 519 follow station count field 516. Station control field set 550 comprises aggregation control information of a single station. A single station control field set 550 is shown to simplify the illustration. However, a number, M, of one or more instances of station control field set 550 are included in a rate control field set 545. Each instance of station control field set 550 is uniquely associated with a single station by way of the station ID included in station ID field 517 of a given station control field set. Other rate control field sets, such as rate control field set 546, that specify control information of frames encoded at other rates may be included in MAC header 510 subsequent to a final station offset field 519 of rate control field set 545. In the present example, rate control field set 546 specifies aggregation control information for stations having frames encoded at a data rate RATE#2 in aggregate frame 500. Particularly, rate control field set 546 specifies control information for a number, N, of stations that have frames encoded at data rate RATE#2 in aggregate frame 500. Thus, N instances of station control field set 551 are included in rate control field set 546. A cyclic redundancy check (CRC) 526 may be appended to MAC frame 510 after the final rate control field set.

Payload data of one or more data rates carried in frame field 506 subsequent MAC frame 510 is included in various frame subfields. In the present example, a single instance of frame subfield 570 having frames of data rate RATE#1 and a single instance of frame subfield 571 having frames of data rate RATE#2 are shown included in frame field 506 to simplify the illustration. However, M instances of frame subfield 570 are included in RATE#1 data sequence 590, and N instances of frame subfield 571 are included in RATE#2 data sequence 591. A final instance of frame subfield 570 and a first instance of frame subfield 571 are separated by a mid-amble 580 to delimit the data rates RATE#1 and RATE#2. Payload offsets are determined by receiving stations in a manner similar to that described above with reference to FIGS. 4A-4C.

Figure 6:
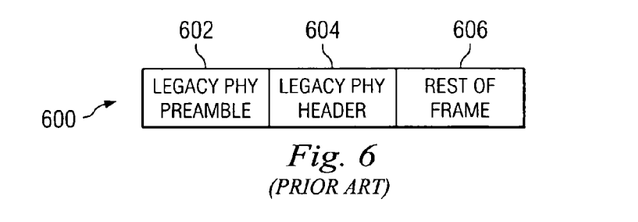
FIG. 6 is a simplified diagram of a legacy frame structure implemented according to the prior art.
Figure 7:
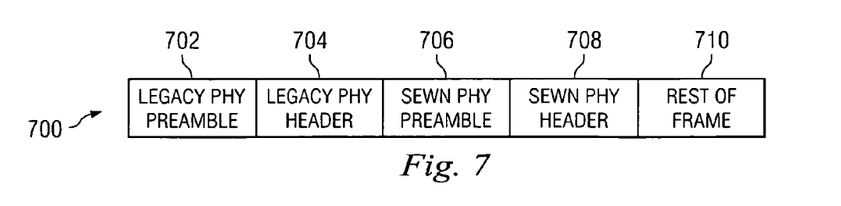
FIG. 7 is a simplified diagram of an aggregate frame structure configured for enhanced power efficiency that may incorporate aggregation control information described in FIGS. 3A-5.

As described above, aggregation control information in an aggregate frame that facilitates enhanced power efficiency may be disposed at various locations in the aggregate frame. FIG. 6 is a simplified diagram of a legacy frame structure 600. Legacy frame structure 600 includes a legacy PHY preamble 602, a legacy PHY header 604, and remaining frame data 606, such as encapsulated MAC frames and the like. FIG. 7 is a simplified diagram of an aggregate frame structure 700 configured for enhanced power efficiency that may incorporate the aggregation control information features described above with reference to FIGS. 3A and 5. Aggregate frame structure 700 is configured to support multiple PHY rates. Particularly, aggregate frame 700 includes a legacy PHY preamble 702, a legacy PHY header 704, a secondary PHY preamble 706, a secondary PHY header 708, and remaining frame data 710. In one implementation, aggregation control information at the PHY layer may be included in secondary PHY header 708. In this configuration, the aggregation control information is added to secondary PHY header 708 or subsequent the secondary PHY header in remaining frame data 710. In another implementation, the aggregation control may be implemented in the MAC layer and thus disposed in remaining frame data 710. Still another configuration provides for the aggregation control to be located in the MAC layer between legacy PHY header 704 and secondary PHY preamble 706. This option provides the advantage of backward compatibility such that a legacy terminal or STA may evaluate a duration/ID field of the aggregation control information and utilize the duration/ID data to remain dormant.

Aggregation is generally more efficient if frames destined to multiple STAs with substantially different link-budgets can be accommodated without matching the error-coding/modulation to the lowest link-budget. However, encoding with different robustness in coding/modulation requires that the codec be emptied and reset in between. This makes uninterrupted encoding with a single codec impossible due to the inherent delay in the codec. Since it is undesirable to precode an entire aggregated burst among others because of the memory requirements, interrupting the burst at the points where the encoding/modulation changes is necessary. In a practical implementation, it may suffice that this interruption be in the order of one OFDM symbol, which can either be occupied with a known sequence or absence of a transmission.

A side-effect of aggregating frames is that the average burst length will increase. It is known that the accuracy of channel-estimates, typically obtained at the beginning of the burst (through a preamble), degrades due to changes in channel conditions when aggregating frames. It is therefore beneficial to use the known sequence mentioned above for channel estimation purposes thereby mitigating this degradation. When used for such purposes, this known sequence is typically known as a mid-amble.

A preamble typically consists of multiple OFDM symbols to facilitate estimation of channel conditions from multiple transmit antennas. As such, the entire preamble may be too large to be repeated as mid-amble within the mid-amble interval. One instance of creating the mid-amble may comprise alternating carriers from the different transmit antennas on consecutive mid-amble intervals. That is, an antenna $n \epsilon [0 \ldots N-1]$ would transmit on the carriers for which $mod(c-m-n, N)=0$ during the $m^{th} \epsilon [0 \ldots M-1]$ mid-amble interval in the aggregated frame, where $c \epsilon [0 \ldots C-1]$ is the carrier index ordered in increasing order of radio frequency.

As described, embodiments of the present disclosure provide a system and method for including aggregation control information in an aggregate frame that facilitates enhanced power efficiency. Aggregation control information may include lengths of frames addressed to different stations. A receiving station is then able to calculate a payload offset within the aggregate frame that identifies the position of frames addressed to the receiving station. The receiving station may then enter a sleep mode and awaken at a proper time for receiving only the frames addressed to the receiving station. Additionally, aggregation control information may include rate information to facilitate aggregation of multi-rate data in an aggregate frame.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

Figure 1B:
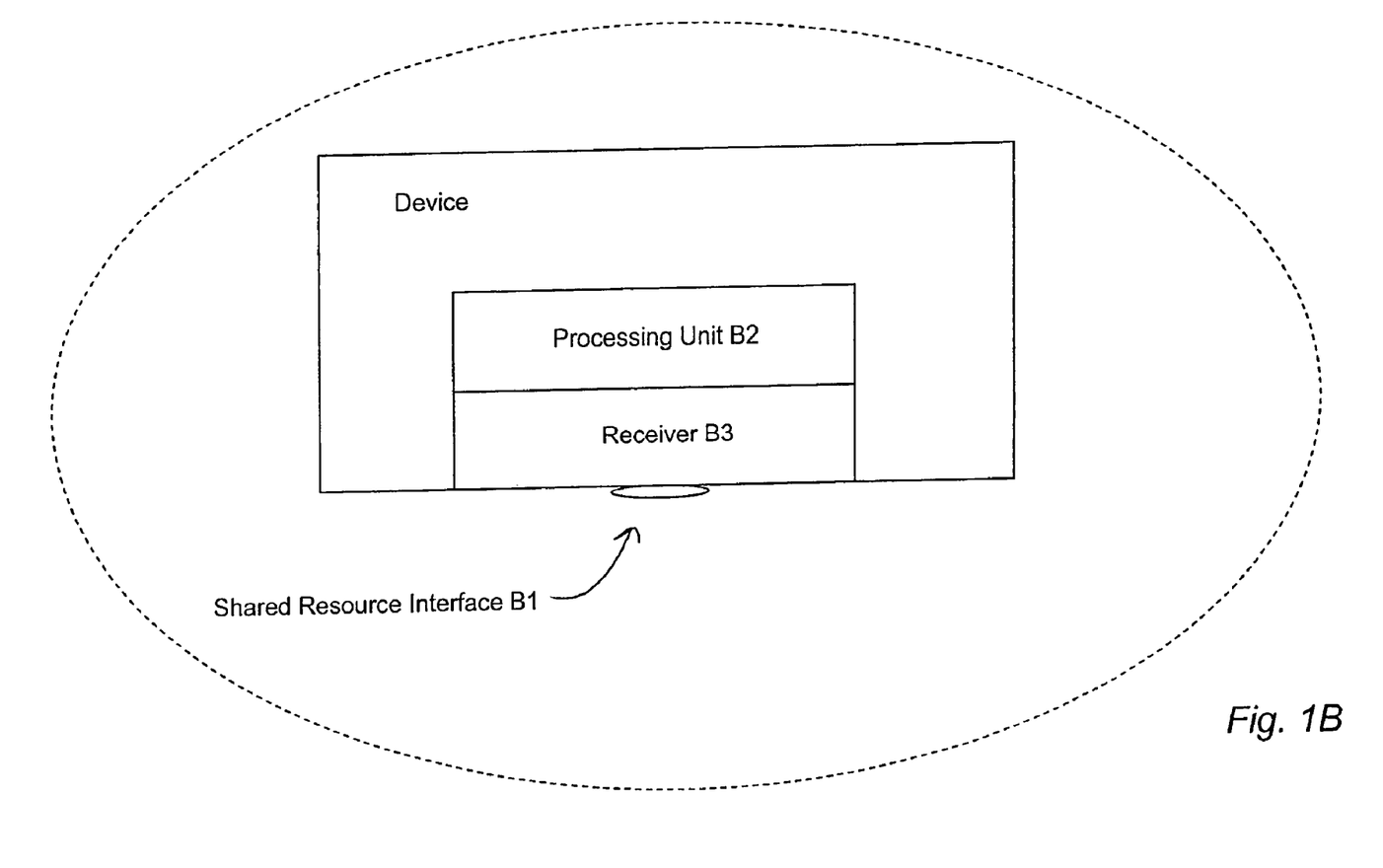
FIG. 1B is a simplified block diagram of a device according to an exemplary embodiment of the invention.

In accordance with an exemplary embodiment of the invention as illustrated in FIG. 1B there is a device adapted to perform communications in a shared resource network, comprising a shared resource interface (B1) configured to receive an aggregate frame that includes a frame field having one or more subfields addressed to one or more devices, wherein the subfield contains one or more frames, and a processing unit (B2) configured to read control information in the aggregate frame, determine that the aggregate frame includes frames addressed to the device, determine a payload offset value that specifies a position within the frame field of the subfield, and invoke a sleep mode having a duration substantially equal to a duration of the payload offset value. In accordance with a particular exemplary embodiment of the invention, as illustrated in FIG. 1B and described herein, the device can be a receiver station such as a wireless local area network station which incorporates a receiver (B3).

What is claimed is:

1. A device comprising:
a processing unit; and
at least one memory including instructions, where the at least one memory and the instructions are configured, with the processing unit, to cause the device to at least:
receive an aggregate frame that includes a frame field having one or more subfields corresponding to respective one or more devices that is allocated an offset period in the aggregate frame for an uplink and downlink data transfer, wherein the aggregate frame contains multi-rate data arranged in data sequences, and wherein each data sequence includes frames of one data rate of the multi-rate data;
read control information in the frame field of the aggregate frame, determining that the frame field includes a subfield for a specific device;
read a rate offset value and a station offset value for at least one of reception and transmission of data;
determine an offset period value for the specific device comprising, calculating an offset length to an offset period allocated to the specific device in the aggregate frame, wherein the offset length is calculated using information stored in at least the subfield for the specific device; and
invoke a sleep mode having a duration that is not greater than the determined offset period value.

2. The device of claim 1, wherein the offset length indicates a start of the uplink data transfer.

3. The device according to claim 1, wherein the aggregate frame is received over a wireless medium.

4. The device of claim 1, wherein the offset period value is calculated from the rate offset value and the station offset value.

5. The device of claim 1, wherein the data sequences include a first data sequence of a first data rate and a second data sequence of a second data rate, end wherein the subfield for the specific device is in the first data sequence and a second subfield for the specific device is in the second data sequence, and further wherein the device is caused to read the subfield in the first data sequence after expiration of the sleep mode and then enter a second sleep mode not greater than a duration of an offset between the subfield in the first data sequence and the second subfield in the second data sequence.

6. The device of claim 5, wherein the first data sequence and the second data sequence are included in a plurality of data sequences, and wherein the plurality of data sequences are arranged in ascending or descending order of respective data rates contained therein.

7. The device of claim 1, wherein the at least one memory and the instructions are configured, with the processing unit, to cause the device to wake up from the sleep mode after the duration that is not greater than the determined offset period value to perform the at least one of reception and transmission of data for a duration determined from the control information.

8. The device of claim 1, wherein the offset length is calculated using length information stored in the subfield for the specific device and wherein the offset length is calculated relative to the end of the frame field.

9. The device of claim 1, wherein the aggregate frame comprises payload data addressed to the device and the at least one memory and the instructions are configured, with the processing unit, to cause the device to determine the offset period value by calculating an offset length to a beginning of the payload data addressed to the device.

10. The device of claim 1, wherein the at least one memory and the instructions are configured, with the processing unit, to cause the device to awaken from the sleep mode at an end of the aggregate frame to determine if any data is addressed to the device in a subsequent aggregate frame.

11. The device of claim 1, wherein the at least one memory and the instructions are configured, with the processing unit, to cause the device to enter a second sleep mode after awakening for a duration suitable to read the subfield for the specific device.

12. A method, comprising:
reading control information in a frame field of an aggregate frame, the frame field having one or more subfields corresponding to respective one or more devices that is allocated an offset period in the aggregate frame for an uplink and downlink data transfer wherein the aggregate frame contains multi-rate data arranged in data sequences, and wherein each data sequence includes frames of one data rate of the multi-rate data;
determining the frame field includes a subfield for a first device;
read a rate offset value and a station offset value for at least one of reception and transmission of data;
determining an offset period value for the first device comprising, calculating an offset length to an offset period allocated for the first device in the aggregate frame, wherein the offset length is calculated using information stored in at least the subfield for the first device; and
invoking a sleep mode of the first device having a duration that is not greater than the determined offset period value.

13. The method of claim 12, further comprising:
waking the device from the sleep mode after the duration that is not greater than the determined offset period value; and
performing the at least one of reception and transmission of data on a transmission medium for a duration determined from the control information.

14. The method of claim 12, wherein the offset length indicates a start of the uplink data transfer.

15. A non-transitory computer-readable medium embodying a computer program executable by a device, said computer program executed to perform operations comprising:
receiving an aggregate frame that includes a frame field having one or more subfields corresponding to respective one or more devices that is allocated an offset period in the aggregate frame for an uplink and downlink data transfer, wherein the aggregate frame contains multi-rate data arranged in data sequences, and wherein each data sequence includes frames of one data rate of the multi-rate data;
reading control information in the frame field of the aggregate frame;
identifying in the frame field a subfield for the specific device;
read a rate offset value and a station offset value for at least one of reception and transmission of data;
determining an offset period value for the specific device comprising, calculating an offset length to an offset period allocated to the specific device in the aggregate frame, wherein the offset length is calculated using information stored in at least the subfield for the specific device; and
invoking a sleep mode in the device having a duration that is not greater than the determined offset period value.

16. The non-transitory computer-readable medium embodying a computer program of claim 15 further comprising:
waking up the device after the duration that is not greater than the determined offset value; and
at least one of receiving and transmitting data on a transmission medium for a duration determined from the information stored in the subfield for the specific device.

17. The non-transitory computer-readable medium embodying a computer program of claim 15, wherein the offset length indicates a start of the uplink data transfer.

18. A non-transitory computer-readable medium embodying a computer program executable to facilitate communications in a shared resource network, said computer program executed to perform operations comprising:
storing a plurality of frame sets each respectively comprising one or more frames;
generating an aggregate frame comprising a frame field having one or more subfields corresponding to respective one or more devices that is allocated an offset period in the aggregate frame for an uplink and downlink data transfer, wherein the aggregate frame contains multi-rate data arranged in data sequences, and wherein each data sequence includes frames of one data rate of the multi-rate data;
inserting one of the plurality of frame sets into each of the plurality of subfields, and inserting control information that includes a plurality of addresses each respectively associated with one of the plurality of subfields into the frame field, wherein the one of the plurality of frame sets inserted in a subfield for a specific device comprises a rate offset value and a station offset value for at least one of reception and transmission of data and information for determining an offset period value to an offset period allocated to a specific of the one or more devices in the aggregate frame; and
invoking a sleep mode having a duration that is not greater than the determined offset period value.

19. The non-transitory computer-readable memory embodying the computer program of claim 18, wherein the plurality of offset values are each respectively associated with a one of the plurality of addresses that specifies a position within the aggregate frame of one of the plurality of subfields.

* * * * *

UNITED STATES PATENT AND TRADEMARK OFFICE
CERTIFICATE OF CORRECTION

| | | |
|---|---|---|
| PATENT NO. | : 7,983,203 B2 | Page 1 of 1 |
| APPLICATION NO. | : 11/120918 | |
| DATED | : July 19, 2011 | |
| INVENTOR(S) | : Kakani et al. | |

It is certified that error appears in the above-identified patent and that said Letters Patent is hereby corrected as shown below:

Col. 14, line 66 delete "end" in between rate and wherein.

Signed and Sealed this
Eleventh Day of October, 2011

David J. Kappos
*Director of the United States Patent and Trademark Office*